(12) United States Patent
Mook et al.

(10) Patent No.: US 10,190,774 B2
(45) Date of Patent: Jan. 29, 2019

(54) FUEL NOZZLE WITH FLEXIBLE SUPPORT STRUCTURES

(71) Applicant: General Electric Company, Schenectady, NY (US)

(72) Inventors: Joshua Tyler Mook, Loveland, OH (US); Jason Joseph Bellardi, Cincinnati, OH (US); Ting-Yu Tu, West Chester, OH (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 15/107,263

(22) PCT Filed: Dec. 23, 2014

(86) PCT No.: PCT/US2014/072028
§ 371 (c)(1),
(2) Date: Jun. 22, 2016

(87) PCT Pub. No.: WO2015/147935
PCT Pub. Date: Oct. 1, 2015

(65) Prior Publication Data
US 2017/0003029 A1 Jan. 5, 2017

Related U.S. Application Data

(60) Provisional application No. 61/920,018, filed on Dec. 23, 2013.

(51) Int. Cl.
*F23R 3/14* (2006.01)
*F23D 11/38* (2006.01)
(Continued)

(52) U.S. Cl.
CPC ............ *F23R 3/283* (2013.01); *F23D 11/386* (2013.01); *F23R 3/14* (2013.01); *F23R 3/343* (2013.01); *Y02T 50/675* (2013.01)

(58) Field of Classification Search
CPC .... F23R 3/283; F23R 3/10; F23R 3/28; F23R 3/34; F23R 3/343; F23R 3/346; F23R 3/36; F23R 3/60
See application file for complete search history.

(56) References Cited

U.S. PATENT DOCUMENTS

| 1,908,066 A | 5/1933 | Sedlmeir |
| 3,258,838 A | 7/1966 | Tilton |
(Continued)

FOREIGN PATENT DOCUMENTS

| CN | 101025167 A | 8/2007 |
| CN | 101900340 A | 12/2010 |
(Continued)

OTHER PUBLICATIONS

International Search Report and Written Opinion issued in connection with corresponding PCT application PCT/US2014/072028 dated Sep. 2, 2015.

(Continued)

*Primary Examiner* — Arun Goyal
*Assistant Examiner* — Stephanie Cheng
(74) *Attorney, Agent, or Firm* — General Electric Company; Pamela Kachur

(57) ABSTRACT

A fuel nozzle apparatus for a gas turbine engine includes: a fuel discharge element having a discharge orifice communicating with a fuel supply connection; a static supporting structure; and a cantilevered flexible support structure interconnecting the supporting structure and the fuel discharge element, the flexible support structure having a first end connected to the static supporting structure, and a second end connected to the fuel discharge element.

9 Claims, 5 Drawing Sheets

(51) Int. Cl.
*F23R 3/28* (2006.01)
*F23R 3/34* (2006.01)

(56) References Cited

U.S. PATENT DOCUMENTS

| | | |
|---|---|---|
| 3,291,191 A | 12/1966 | Stoops |
| 3,480,416 A | 11/1969 | Stoops et al. |
| 3,656,222 A | 4/1972 | Jones |
| 3,672,032 A | 6/1972 | Witherspoon |
| 3,684,186 A | 8/1972 | Helmrich |
| 3,707,750 A | 1/1973 | Klass |
| 3,837,198 A | 9/1974 | Higgins |
| 3,909,157 A | 9/1975 | Wachtell et al. |
| 4,085,717 A | 4/1978 | Willmann et al. |
| 4,088,437 A | 5/1978 | Holzapfel |
| 4,216,652 A | 8/1980 | Herman |
| 4,247,259 A | 1/1981 | Saboe et al. |
| 4,273,070 A | 6/1981 | Hoefelmayr |
| 4,327,547 A | 5/1982 | Hughes et al. |
| 4,425,755 A | 1/1984 | Hughes |
| 4,461,323 A | 7/1984 | Morikawa et al. |
| 4,582,093 A | 4/1986 | Hubbard et al. |
| 4,584,834 A | 4/1986 | Koshoffer et al. |
| 4,609,150 A | 9/1986 | Pane, Jr. et al. |
| 4,610,320 A | 9/1986 | Beakley |
| 4,674,167 A | 6/1987 | Hubbard et al. |
| 4,722,559 A | 2/1988 | Bongartz |
| 4,798,330 A | 1/1989 | Mancini et al. |
| 4,969,110 A | 11/1990 | Little et al. |
| 5,038,014 A | 8/1991 | Pratt et al. |
| 5,057,073 A | 10/1991 | Martin |
| 5,062,205 A | 11/1991 | Fraser |
| 5,097,666 A | 3/1992 | Shekleton et al. |
| 5,117,637 A | 6/1992 | Howell et al. |
| 5,197,191 A | 3/1993 | Dunkman et al. |
| 5,220,786 A | 6/1993 | Campbell |
| 5,270,926 A | 12/1993 | Tam |
| 5,297,215 A | 3/1994 | Yamagishi |
| 5,309,709 A | 5/1994 | Cederwall et al. |
| 5,321,947 A | 6/1994 | Sood et al. |
| 5,321,951 A | 6/1994 | Falls et al. |
| 5,329,761 A | 7/1994 | Ablett et al. |
| 5,460,758 A | 10/1995 | Langer et al. |
| 5,474,419 A | 12/1995 | Reluzco et al. |
| 5,501,840 A | 3/1996 | Mantovani |
| 5,673,552 A | 10/1997 | Idleman et al. |
| 5,713,205 A | 2/1998 | Sciocchetti et al. |
| 5,715,167 A | 2/1998 | Gupta et al. |
| 5,761,907 A | 6/1998 | Pelletier et al. |
| 5,794,601 A | 8/1998 | Pantone |
| 5,824,250 A | 10/1998 | Whalen et al. |
| 5,836,163 A | 11/1998 | Lockyer |
| 5,916,142 A | 6/1999 | Snyder et al. |
| 5,963,314 A | 10/1999 | Worster et al. |
| 5,988,531 A | 11/1999 | Maden et al. |
| 5,993,731 A | 11/1999 | Jech et al. |
| 6,003,756 A | 12/1999 | Rhodes |
| 6,032,457 A | 3/2000 | McKinney et al. |
| 6,041,132 A | 3/2000 | Isaacs et al. |
| 6,068,330 A | 5/2000 | Kasuga et al. |
| 6,134,780 A | 10/2000 | Coughlan et al. |
| 6,144,008 A | 11/2000 | Rabinovich |
| 6,227,801 B1 | 5/2001 | Liu |
| 6,256,995 B1 | 7/2001 | Sampath et al. |
| 6,269,540 B1 | 8/2001 | Islam et al. |
| 6,283,162 B1 | 9/2001 | Butler |
| 6,354,072 B1 | 3/2002 | Hura |
| 6,355,086 B2 | 3/2002 | Brown et al. |
| 6,363,726 B1 | 4/2002 | Durbin et al. |
| 6,367,262 B1 | 4/2002 | Mongia et al. |
| 6,381,964 B1 | 5/2002 | Pritchard, Jr. et al. |
| 6,389,815 B1 | 5/2002 | Hura et al. |
| 6,391,251 B1 | 5/2002 | Keicher et al. |
| 6,405,095 B1 | 6/2002 | Jang et al. |
| 6,418,726 B1 | 7/2002 | Foust et al. |
| 6,419,446 B1 | 7/2002 | Kvasnak et al. |
| 6,442,940 B1 | 9/2002 | Young et al. |
| 6,453,660 B1 | 9/2002 | Johnson et al. |
| 6,460,340 B1 | 10/2002 | Chauvette et al. |
| 6,461,107 B1 | 10/2002 | Lee et al. |
| 6,478,239 B2 | 11/2002 | Chung et al. |
| 6,484,489 B1 | 11/2002 | Foust et al. |
| 6,505,089 B1 | 1/2003 | Yang et al. |
| 6,523,350 B1 | 2/2003 | Mancini et al. |
| 6,546,732 B1 | 4/2003 | Young et al. |
| 6,547,163 B1 | 4/2003 | Mansour et al. |
| 6,564,831 B1 | 5/2003 | Sanoner et al. |
| 6,634,175 B1 | 10/2003 | Kawata et al. |
| 6,662,565 B2 | 12/2003 | Brundish et al. |
| 6,672,654 B2 | 1/2004 | Yamada et al. |
| 6,676,892 B2 | 1/2004 | Das et al. |
| 6,692,037 B1 | 2/2004 | Lin |
| 6,705,383 B2 | 3/2004 | Beeck et al. |
| 6,711,898 B2 | 3/2004 | Laing et al. |
| 6,715,292 B1 | 4/2004 | Hoke |
| 6,718,770 B2 | 4/2004 | Laing et al. |
| 6,755,024 B1 | 6/2004 | Mao et al. |
| 6,756,561 B2 | 6/2004 | McGregor et al. |
| 6,796,770 B2 | 9/2004 | Gigas et al. |
| D498,825 S | 11/2004 | Fu |
| 6,811,744 B2 | 11/2004 | Keicher et al. |
| 6,834,505 B2 | 12/2004 | Al-Roub et al. |
| 6,865,889 B2 | 3/2005 | Mancini et al. |
| 6,898,938 B2 | 5/2005 | Mancini et al. |
| 6,915,840 B2 | 7/2005 | Devine, II et al. |
| 6,951,227 B1 | 10/2005 | Su |
| 6,976,363 B2 | 12/2005 | McMasters et al. |
| 6,993,916 B2 | 2/2006 | Johnson et al. |
| 7,007,864 B2 | 3/2006 | Snyder et al. |
| 7,062,920 B2 | 6/2006 | McMasters et al. |
| 7,104,066 B2 | 9/2006 | Leen et al. |
| 7,121,095 B2 | 10/2006 | McMasters et al. |
| 7,144,221 B2 | 12/2006 | Giffin |
| 7,146,725 B2 | 12/2006 | Kottilingam et al. |
| 7,358,457 B2 | 4/2008 | Peng et al. |
| 7,434,313 B2 | 10/2008 | Dasilva et al. |
| 7,455,740 B2 | 11/2008 | Bostanjoglo et al. |
| 7,540,154 B2 | 6/2009 | Tanimura et al. |
| 7,559,202 B2 | 7/2009 | Prociw et al. |
| 7,572,524 B2 | 8/2009 | Sabol et al. |
| 7,654,000 B2 | 2/2010 | Prociw et al. |
| 7,665,306 B2 | 2/2010 | Bronson et al. |
| 7,712,313 B2 | 5/2010 | Kojovic et al. |
| 7,748,221 B2 | 7/2010 | Patel et al. |
| 7,762,073 B2 * | 7/2010 | Li .................. F23R 3/14 60/734 |
| 7,827,800 B2 | 11/2010 | Stastnya et al. |
| 7,845,549 B2 | 12/2010 | Budinger |
| 8,074,866 B2 | 12/2011 | Bird |
| 8,108,058 B2 | 1/2012 | Murrish et al. |
| 8,256,221 B2 | 9/2012 | Rubio et al. |
| 8,316,541 B2 | 11/2012 | Patel et al. |
| 2001/0031920 A1 | 10/2001 | Kaufman et al. |
| 2002/0085941 A1 | 7/2002 | Deevi et al. |
| 2002/0125336 A1 | 9/2002 | Bretz |
| 2002/0129606 A1 | 9/2002 | Wrubel et al. |
| 2002/0152715 A1 | 10/2002 | Rotheroe |
| 2003/0105538 A1 | 6/2003 | Wooten |
| 2003/0121266 A1 | 7/2003 | Modi et al. |
| 2003/0131474 A1 | 7/2003 | Kastrup et al. |
| 2004/0062636 A1 | 4/2004 | Mazzola et al. |
| 2004/0086635 A1 | 5/2004 | Grossklaus et al. |
| 2004/0101022 A1 | 5/2004 | Hardwicke et al. |
| 2004/0148937 A1 | 8/2004 | Mancini et al. |
| 2004/0200069 A1 | 10/2004 | Nguyen et al. |
| 2005/0028526 A1 | 2/2005 | Von Der Bank |
| 2005/0047914 A1 | 3/2005 | Tomberg |
| 2005/0144954 A1 | 7/2005 | Lemon et al. |
| 2005/0204769 A1 | 9/2005 | Oberley et al. |
| 2005/0205232 A1 | 9/2005 | Wang et al. |
| 2005/0235493 A1 | 10/2005 | Philip et al. |
| 2005/0257530 A1 | 11/2005 | Zupanc et al. |
| 2005/0262843 A1 | 12/2005 | Monty |
| 2005/0265828 A1 | 12/2005 | Horng et al. |

(56) References Cited

U.S. PATENT DOCUMENTS

| | | | |
|---|---|---|---|
| 2005/0271507 A1 | 12/2005 | Muriithi et al. | |
| 2006/0042083 A1 | 3/2006 | Baker et al. | |
| 2006/0248898 A1 | 11/2006 | Buelow et al. | |
| 2007/0017224 A1 | 1/2007 | Li et al. | |
| 2007/0028595 A1 | 2/2007 | Mongia et al. | |
| 2007/0028617 A1 | 2/2007 | Hsieh et al. | |
| 2007/0028618 A1 | 2/2007 | Hsiao et al. | |
| 2007/0028620 A1 | 2/2007 | McMasters et al. | |
| 2007/0028624 A1 | 2/2007 | Hsieh et al. | |
| 2007/0071902 A1 | 3/2007 | Dietrich et al. | |
| 2007/0084047 A1 | 4/2007 | Lange et al. | |
| 2007/0084049 A1 | 4/2007 | Wang et al. | |
| 2007/0098929 A1 | 5/2007 | Dietrich et al. | |
| 2007/0119177 A1* | 5/2007 | McMasters | F23R 3/283 60/737 |
| 2007/0141375 A1 | 6/2007 | Budinger et al. | |
| 2007/0163263 A1 | 7/2007 | Thomson et al. | |
| 2007/0169486 A1 | 7/2007 | Hernandez et al. | |
| 2007/0205184 A1 | 9/2007 | Mazumder et al. | |
| 2007/0207002 A1 | 9/2007 | Roh | |
| 2007/0227147 A1 | 10/2007 | Cayre et al. | |
| 2007/0287027 A1 | 12/2007 | Justin et al. | |
| 2008/0014457 A1 | 1/2008 | Gennaro et al. | |
| 2008/0078080 A1 | 4/2008 | Patel et al. | |
| 2008/0110022 A1 | 5/2008 | Brown et al. | |
| 2008/0178994 A1 | 7/2008 | Qi et al. | |
| 2008/0182017 A1 | 7/2008 | Singh et al. | |
| 2008/0182107 A1 | 7/2008 | Lee | |
| 2008/0314878 A1 | 12/2008 | Cai et al. | |
| 2009/0113893 A1 | 5/2009 | Li et al. | |
| 2009/0255256 A1 | 10/2009 | McMasters et al. | |
| 2009/0255264 A1 | 10/2009 | McMasters et al. | |
| 2010/0263382 A1 | 10/2010 | Mancini et al. | |
| 2010/0269506 A1* | 10/2010 | Nonaka | F23D 11/386 60/742 |
| 2010/0307161 A1* | 12/2010 | Thomson | F23D 11/107 60/748 |
| 2011/0206533 A1 | 8/2011 | Lee et al. | |
| 2011/0259976 A1 | 10/2011 | Tyler et al. | |
| 2012/0047903 A1 | 3/2012 | Williams et al. | |
| 2012/0151930 A1* | 6/2012 | Patel | F23D 11/383 60/746 |
| 2012/0227408 A1 | 9/2012 | Buelow | |
| 2012/0228405 A1 | 9/2012 | Buelow et al. | |
| 2014/0190167 A1* | 7/2014 | Shi | F23R 3/007 60/737 |

FOREIGN PATENT DOCUMENTS

| | | |
|---|---|---|
| CN | 102798150 A | 11/2012 |
| CN | 102997280 A | 3/2013 |
| CN | 103184899 A | 7/2013 |
| EP | 0019421 A2 | 11/1980 |
| EP | 0042454 A1 | 12/1981 |
| EP | 1413830 A2 | 4/2004 |
| EP | 1484553 A2 | 12/2004 |
| EP | 1793169 A2 | 6/2007 |
| EP | 1806536 A1 | 7/2007 |
| EP | 2009257 A1 | 12/2008 |
| EP | 2397763 A1 | 12/2011 |
| FR | 2896303 A1 | 7/2007 |
| GB | 837500 A | 6/1960 |
| GB | 2437977 A | 11/2007 |
| JP | S51-138225 A | 11/1976 |
| JP | 5575535 A | 6/1980 |
| JP | 5841471 U | 3/1983 |
| JP | S60-126521 A | 7/1985 |
| JP | 62150543 U | 9/1987 |
| JP | 05-086902 A | 4/1993 |
| JP | S6-229553 A | 8/1994 |
| JP | 0714022 A | 1/1995 |
| JP | H08-285228 A | 11/1996 |
| JP | 10148334 A | 6/1998 |
| JP | 2798281 B2 | 9/1998 |
| JP | 11237047 A | 8/1999 |
| JP | H11-350978 A | 12/1999 |
| JP | 2000296561 A | 10/2000 |
| JP | 2000320836 A | 11/2000 |
| JP | 2001041454 A | 2/2001 |
| JP | 2002115847 A | 4/2002 |
| JP | 2002-520568 A | 7/2002 |
| JP | 2003106528 A | 4/2003 |
| JP | 2003129862 A | 5/2003 |
| JP | 2003515718 A | 5/2003 |
| JP | 2003214300 A | 7/2003 |
| JP | 2004168610 A | 6/2004 |
| JP | 2005076639 A | 3/2005 |
| JP | 2005106411 A | 4/2005 |
| JP | 2005337703 A | 12/2005 |
| JP | 2005344717 A | 12/2005 |
| JP | 2006524579 A | 11/2006 |
| JP | 2007046886 A | 2/2007 |
| JP | 2007183093 A | 7/2007 |
| JP | 3960222 B2 | 8/2007 |
| JP | 2007-530263 A | 11/2007 |
| JP | 2008-008612 A | 1/2008 |
| JP | 2008069449 A | 3/2008 |
| JP | 2012-132671 A | 7/2012 |
| WO | 9855800 A1 | 12/1998 |
| WO | 2006079459 A1 | 8/2006 |
| WO | 2009/126701 A2 | 10/2009 |

OTHER PUBLICATIONS

Michael R. Johnson, U.S. Appl. No. 11/332,532, filed Jan. 13, 2006.

Kastrup et al., U.S. Appl. No. 12/120,785, filed May 15, 2008.

McMasters et al., U.S. Appl. No. 12/182,500, filed Jul. 30, 2008.

McMasters et al., U.S. Appl. No. 12/418,875, filed Apr. 6, 2009.

Mcmasters et al., U.S. Appl. No. 61/666,644, filed Jun. 29, 2012.

Benjamin et al., U.S. Appl. No. 61/787,961, Mar. 15, 2013.

Mook et al., U.S. Appl. No. 61/799,845, filed Mar. 15, 2013.

McMasters et al., U.S. Appl. No. 14/328,347, filed Jul. 10, 2014.

Barnhart et al., U.S. Appl. No. 15/039,065, filed May 25, 2016.

Benjamin et al., U.S. Appl. No. 15/107,282, filed Jun. 22, 2016.

Unofficial English Translation of Japanese Office Action issued in connection with related JP Application No. 2011504034 dated Aug. 6, 2013.

U.S. Non-Final Office Action issued in connection with related U.S. Appl. No. 12/412,512 dated Sep. 26, 2013.

Unofficial English Translation of Japanese Notice of Allowance Office Action issued in connection with related JP Application No. 2011504037 dated Oct. 22, 2013.

Unofficial English Translation of Japanese Notice of Allowance Office Action issued in connection with related JP Application No. 2011504035 dated Nov. 12, 2013.

U.S. Notice of Allowance Office Action issued in connection with related U.S. Appl. No. 12/412,512 dated Apr. 30, 2014.

Unofficial English Translation of Japanese Office Action issued in connection with related JP Application No. 2011504059 dated Jun. 3, 2014

Unofficial English Translation of Japanese Office Action issued in connection with corresponding JP Application No. 2011504034 dated Aug. 5, 2014

Unofficial English Translation of Japanese Notice of Allowance Office Action issued in connection with related JP Application No. 2011504059 dated Mar. 3, 2015.

Unofficial English Translation of Japanese Notice of Allowance Office Action issued in connection with related JP Application No. 2011504034 dated Jun. 30, 2015.

PCT Invitation to Pay Additional Fees issued in connection with related PCT Application No. PCT/US2014/066966 dated Aug. 20, 2015.

PCT Search Report and Written Opinion issued in connection with related PCT Application No. PCT/US2014/072023 dated Sep. 2, 2015

PCT Search Report and Written Opinion issued in connection with related PCT Application No. PCT/US2014/66966 dated Oct. 12, 2015.

(56) References Cited

OTHER PUBLICATIONS

U.S. Non-Final Office Action issued in connection with related U.S. Appl. No. 14/328,347 dated Oct. 20, 2016
First Office Action and Search issued in connection with corresponding CN Application No. 201480070681.7 dated Mar. 24, 2017.
Notification of Reasons for Refusal issued in connection with related JP Application No. 2016-533696 dated Apr. 24, 2017.
Japanese Search Report issued in connection with related JP Application No. 2016-533696 dated Apr. 27, 2017.
First Office Action and Search issued in connection with related CN Application No. 201480065056.3 dated May 24, 2017.
Liu et al., "RP of Si3 N4 Burner Arrays via Assembly Mould SDM", Rapid Prototyping, vol. No. 10, Issue No. 4, pp. 239-246, 2004.
U.S. Non-Final Office Action issued in connection with related U.S. Appl. No. 12/182,469 dated Feb. 4, 2009.
U.S. Non-Final Office Action issued in connection with related U.S. Appl. No. 11/332,532 dated Mar. 17, 2009.
U.S. Final Office Action issued in connection with related U.S. Appl. No. 11/332,532 dated Aug. 20, 2009.
U.S. Final Office Action issued in connection with related U.S. Appl. No. 12/182,469 dated Nov. 12, 2009.
U.S. Non-Final Office Action issued in connection with related U.S. Appl. No. 12/182,469 dated May 28, 2010.
U.S. Non-Final Office Action issued in connection with related U.S. Appl. No. 11/332,532 dated Feb. 18, 2011.
U.S. Non-Final Office Action issued in connection with related U.S. Appl. No. 12/120,785 dated Apr. 13, 2011.
U.S. Non-Final Office Action issued in connection with related U.S. Appl. No. 12/200,960 dated Apr. 29, 2011.
U.S. Non-Final Office Action issued in connection with related U.S. Appl. No. 12/182,500 dated Jun. 15, 2011.
U.S. Non-Final Office Action issued in connection with related U.S. Appl. No. 12/182,526 dated Jul. 5, 2011.
U.S. Non-Final Office Action issued in connection with related U.S. Appl. No. 12/182,485 dated Jul. 11, 2011.
U.S. Final Office Action issued in connection with related U.S. Appl. No. 12/200,960 dated Aug. 16, 2011.
U.S. Non-Final Office Action issued in connection with related U.S. Appl. No. 12/200,956 dated Sep. 15, 2011.
U.S. Non-Final Office Action issued in connection with related U.S. Appl. No. 12/120,797 dated Nov. 7, 2011.
U.S. Non-Final Office Action issued in connection with related U.S. Appl. No. 12/262,237 dated Nov. 7, 2011.
U.S. Final Office Action issued in connection with related U.S. Appl. No. 11/332,532 dated Nov. 8, 2011.
U.S. Non-Final Office Action issued in connection with related U.S. Appl. No. 12/262,225 dated Jan. 3, 2012.
U.S. Non-Final Office Action issued in connection with related U.S. Appl. No. 12/182,526 dated Jan. 17, 2012.
U.S. Non-Final Office Action issued in connection with related U.S. Appl. No. 12/412,512 dated Jan. 19, 2012.
U.S. Non-Final Office Action issued in connection with related U.S. Appl. No. 12/418,875 dated Jan. 31, 2012.
PCT Invitation to Pay Additional Fees issued in connection with related PCT Application No. PCT/US2009/039085 dated Feb. 6, 2012.
PCT Search Report and Written Opinion issued in connection with related PCT Application No. PCT/US2009/039100 dated Feb. 6, 2012.
PCT Search Report and Written Opinion issued in connection with related PCT Application No. PCT/US2009/037224 dated Feb. 7, 2012.
PCT Search Report and Written Opinion issued in connection with related PCT Application No. PCT/US2009/039894 dated Mar. 8, 2012.
PCT Search Report and Written Opinion issued in connection with related PCT Application No. PCT/US2009/037101 dated Mar. 13, 2012.
U.S. Final Office Action issued in connection with related U.S. Appl. No. 12/262,237 dated Mar. 15, 2012.
PCT Search Report and Written Opinion issued in connection with related PCT Application No. PCT/US2009/037148 dated Mar. 20, 2012.
PCT Search Report and Written Opinion issued in connection with related PCT Application No. PCT/US2009/037221 dated Mar. 20, 2012.
PCT Search Report and Written Opinion issued in connection with related PCT Application No. PCT/US2009/039928 dated Mar. 27, 2012.
U.S. Non-Final Office Action issued in connection with related U.S. Appl. No. 11/332,532 dated Apr. 6, 2012.
U.S. Final Office Action issued in connection with related U.S. Appl. No. 12/412,512 dated May 23, 2012.
U.S. Non-Final Office Action issued in connection with related U.S. Appl. No. 12/412,523 dated May 24, 2012.
U.S. Final Office Action issued in connection with related U.S. Appl. No. 12/418,875 dated May 25, 2012.
PCT Invitation to Pay Additional Fees issued in connection with related PCT Application No. PCT/US2009/039385 dated Jun. 6, 2012.
U.S. Non-Final Office Action issued in connection with related U.S. Appl. No. 12/418,889 dated Jun. 13, 2012.
U.S. Non-Final Office Action issued in connection with related U.S. Appl. No. 12/418,901 dated Jun. 18, 2012.
U.S. Final Office Action issued in connection with related U.S. Appl. No. 12/262,225 dated Jun. 29, 2012.
PCT Search Report and Written Opinion issued in connection with related PCT Application No. PCT/US2009/039085 dated Jul. 3, 2012.
U.S. Final Office Action issued in connection with related U.S. Appl. No. 12/120,797 dated Jul. 23, 2012.
U.S. Final Office Action issued in connection with related U.S. Appl. No. 12/182,526 dated Jul. 24, 2012.
U.S. Final Office Action issued in connection with related U.S. Appl. No. 11/332,532 dated Aug. 3, 2012.
U.S. Non-Final Office Action issued in connection with related U.S. Appl. No. 12/200,960 dated Aug. 13, 2012.
PCT Search Report and Written Opinion issued in connection with related PCT Application No. PCT/US2009/39385 dated Nov. 22, 2012.
U.S. Non-Final Office Action issued in connection with related U.S. Appl. No. 11/332,532 dated Jan. 3, 2013.
Unofficial English Translation of Japanese Office Action issued in connection with related JP Application No. 2011504037 dated Mar. 26, 2013.
Unofficial English Translation of Japanese Office Action issued in connection with related JP Application No. 2011504035 dated Apr. 2, 2013.
Unofficial English Translation of Japanese Office Action issued in connection with related JP Application No. 2011504038 dated Apr. 2, 2013.
U.S. Final Office Action issued in connection with related U.S. Appl. No. 11/332,532 dated Apr. 29, 2013.
Unofficial English Translation of Japanese Office Action issued in connection with related JP Application No. 2011504059 dated May 28, 2013.
Notification of Reasons for Refusal issued in connection with corresponding JP Application No. 2016-541035 dated Sep. 25, 2018.

* cited by examiner

FUEL NOZZLE WITH FLEXIBLE SUPPORT STRUCTURES

CROSS-REFERENCE TO RELATED APPLICATIONS

This application is a national stage application under 35 U.S.C. § 371(c) of prior filed, co-pending PCT application serial number PCT/US2014/072028, filed on Dec. 23, 2014 which claims priority to U.S. provisional patent application 61/920,018, titled "FUEL NOZZLE WITH FLEXIBLE SUPPORT STRUCTURES", filed on Dec. 23, 2013. The above-listed applications are herein incorporated by reference.

BACKGROUND

Embodiments of the present invention relate to gas turbine engine fuel nozzles and, more particularly, to apparatus for supporting various structures within turbine engine fuel nozzles.

Aircraft gas turbine engines include a combustor in which fuel is burned to input heat to the engine cycle. Typical combustors incorporate one or more fuel injectors whose function is to introduce liquid fuel into an air flow stream so that it can atomize and burn.

Staged combustion systems have been developed to limit pollution, increase efficiency, lower cost, increase engine output, and improve operability. In a staged combustion system, the nozzles of the combustor are operable to selectively inject fuel through two or more discrete stages, each stage being defined by individual fuel flowpaths within the fuel nozzle. For example, the fuel nozzle may include a pilot stage that operates continuously, and a main stage that only operates at higher engine power levels. The fuel flowrate may also be variable within each of the stages.

A typical fuel nozzle is a complex assembly including a nozzle tip mounted to a stem connected to a stationary portion of the gas turbine engine. The nozzle tip typically includes numerous internally-supported components, defining intricate, small cross-section passages for the flow of air and fuel. Portions of the fuel nozzle are exposed to high-temperature airflows and radiant heating, while other portions are isolated from heating and exposed to a flow of relatively cool liquid fuel. Generally, the hot and cold portions should be isolated to avoid thermal stresses and heat-induced carbon deposits (i.e. "coking") in the fuel-bearing passages.

Furthermore, the entire fuel nozzle is subject to significant vibration at various frequencies. The internal support structures of the fuel nozzle must be stiff enough to avoid fatigue failure and undesired harmonic behavior, but also have some compliance in order to avoid load transfer from one component to another within the fuel nozzle.

Accordingly, it may be beneficial to have a fuel nozzle with internal structures that are mechanically and thermo-dynamically isolated.

BRIEF DESCRIPTION

This need is addressed by embodiments of the present invention, which provide a staged fuel nozzle incorporating one or more flexible support structures to provide structural support for other elements of the fuel nozzle.

According to one aspect of the invention, a fuel nozzle apparatus for a gas turbine engine includes: a fuel discharge element having a discharge orifice communicating with a fuel supply connection; a static supporting structure; and a cantilevered flexible support structure interconnecting the supporting structure and the fuel discharge element, the flexible support structure having a first end connected to the static supporting structure, and a second end connected to the fuel discharge element.

According to another aspect of the invention, the fuel discharge element, the static supporting structure, and the flexible support structure all form part of a single monolithic construction.

According to another aspect of the invention, a fuel nozzle apparatus for a gas turbine engine includes: an annular inner wall disposed coaxially along a centerline axis and having a fuel discharge orifice at a first end thereof; an annular outer wall surrounding the inner wall interconnecting the inner wall and the outer wall extends at an acute angle to the centerline axis joins the outer wall at a forward junction joins the inner wall at an aft junction has a smoothly-curved, arcuate shape.

According to another aspect of the invention, the support arm is a single, fully-annular structure.

According to another aspect of the invention, the inner wall has a metering plug disposed therein, the metering plug including at least one spray hole communication with the fuel discharge orifice disposed coaxially along a centerline axis and having a circumferential fuel gallery therein, and including radial array of fuel orifices communicating with the fuel gallery interconnecting the ring support and the injection ring includes a forward portion that extends radially outward and aft from the main ring support that extends axially aft and radially inward from an outer end of the forward portion is cantilevered from the main ring support by way of the support arms are provided.

According to another aspect of the invention, the support arm is a single, fully-annular structure.

According to another aspect of the invention, a forward end of the support arm joins the ring support at a forward junction joins the injection ring at an aft junction has a smoothly-curved, arcuate shape.

According to another aspect of the invention, the support arm has a maximum thickness at the aft junction, tapering to a minimum thickness at a location where the aft portion joins the forward portion.

BRIEF DESCRIPTION OF THE DRAWINGS

The embodiments of the present invention may be best understood by reference to the following description taken in conjunction with the accompanying drawing figures in which.

DETAILED DESCRIPTION

Generally, the embodiments of the present invention provide a staged fuel nozzle incorporating one or more flexible support structures to provide structural support for other elements of the fuel nozzle. As used herein, the term "flexible support structure" generally refers to a structure that exhibits flexibility and resilience attributable to its physical shape and size, and generally refers to relatively thin, elongated structures. The purpose of the flexible support structure is to provide physical support for an attached structure while maintaining stresses in the support structure at acceptable levels during various operation conditions, especially during temperature changes. An alternative term for "flexible support structures" is "stress-tailored support structure." The principles of the embodiments of the present invention could also be applied to other types of fuel nozzles, including those which are not staged.

Figure 1:
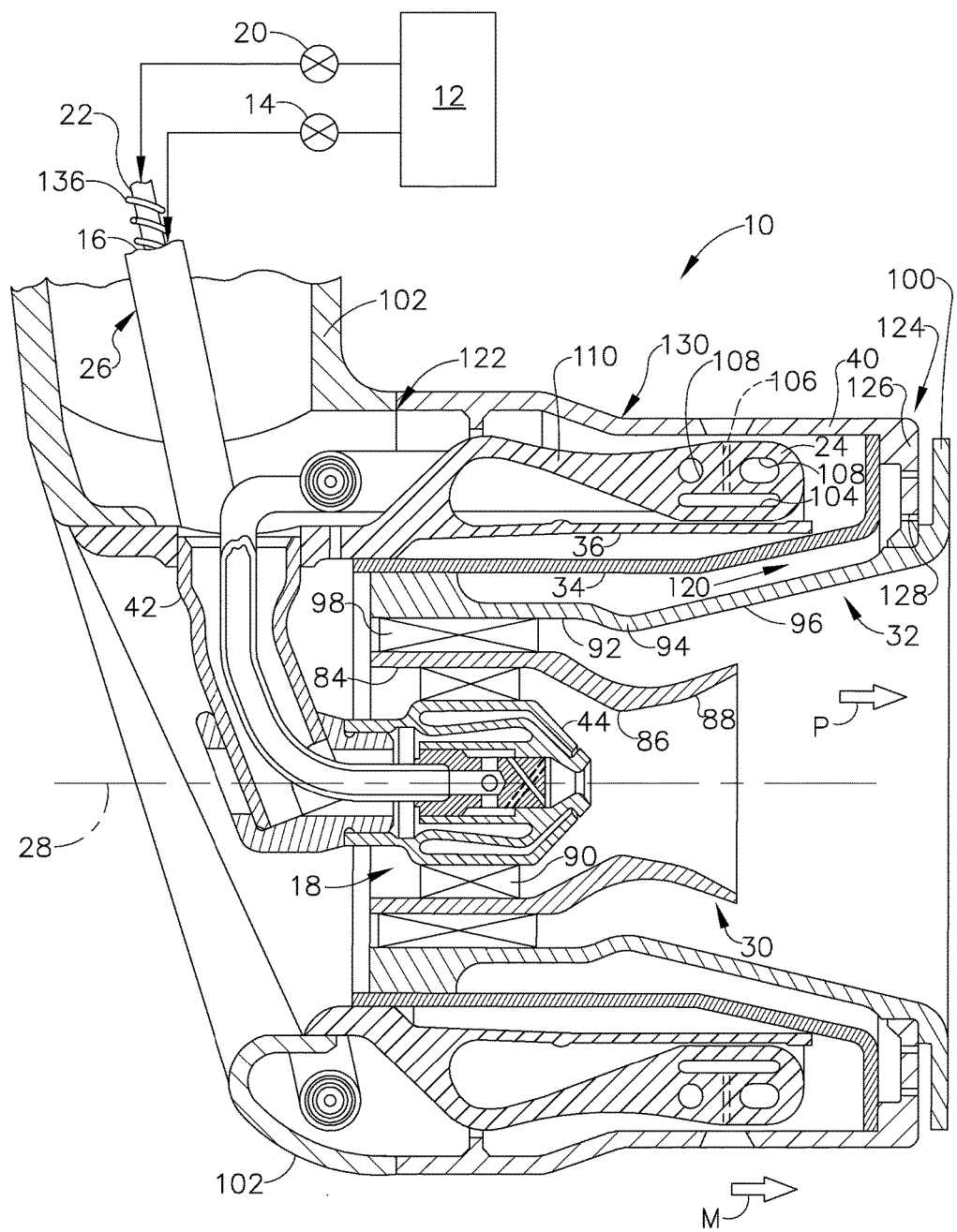
FIG. 1 is a schematic cross-sectional view of a gas turbine engine fuel nozzle constructed according to an aspect of the present invention.

Now, referring to the drawings wherein identical reference numerals denote the same elements throughout the various views, FIG. 1 depicts an exemplary of a fuel nozzle 10 of a type configured to inject liquid hydrocarbon fuel into an airflow stream of a gas turbine engine combustor (not shown). The fuel nozzle 10 is of a "staged" type meaning it is operable to selectively inject fuel through two or more discrete stages, each stage being defined by individual fuel flowpaths within the fuel nozzle 10. The fuel flowrate may also be variable within each of the stages.

The fuel nozzle 10 is connected to a fuel system 12 of a known type, operable to supply a flow of liquid fuel at varying flowrates according to operational need. The fuel system supplies fuel to a pilot valve 14 which is coupled to a pilot fuel conduit 16, which ultimately communicates fuel to a pilot 18 of the fuel nozzle 10. The fuel system 12 also supplies fuel to a main valve 20 which is coupled to a main fuel conduit 22, which in turn supplies a main injection ring 24 of the fuel nozzle 10. In the illustrated example, the pilot fuel conduit 16 and the main fuel conduit 22 are defined by co-axial fuel flow circuits within a single fuel conduit 26 which is described in more detail below. The fuel nozzle 10 and its constituent components may be constructed from one or more metallic alloys. Nonlimiting examples of suitable alloys include nickel and cobalt-based alloys.

For purposes of description, reference will be made to a centerline axis 28 of the fuel nozzle 10 which is generally parallel to a centerline axis of the engine (not shown) in which the fuel nozzle 10 would be used. Starting from the centerline axis 28 and proceeding radially outward, the major components of the illustrated fuel nozzle 10 are: the pilot 18, a splitter 30, a venturi 32, an inner body 34, a main ring support 36, the main injection ring 24, and an outer body 40. Each of these structures will be described in detail.

The pilot 18 is disposed at an upstream end of the fuel nozzle 10, aligned with the centerline axis 28 and connected to a fairing 42.

Figure 2:
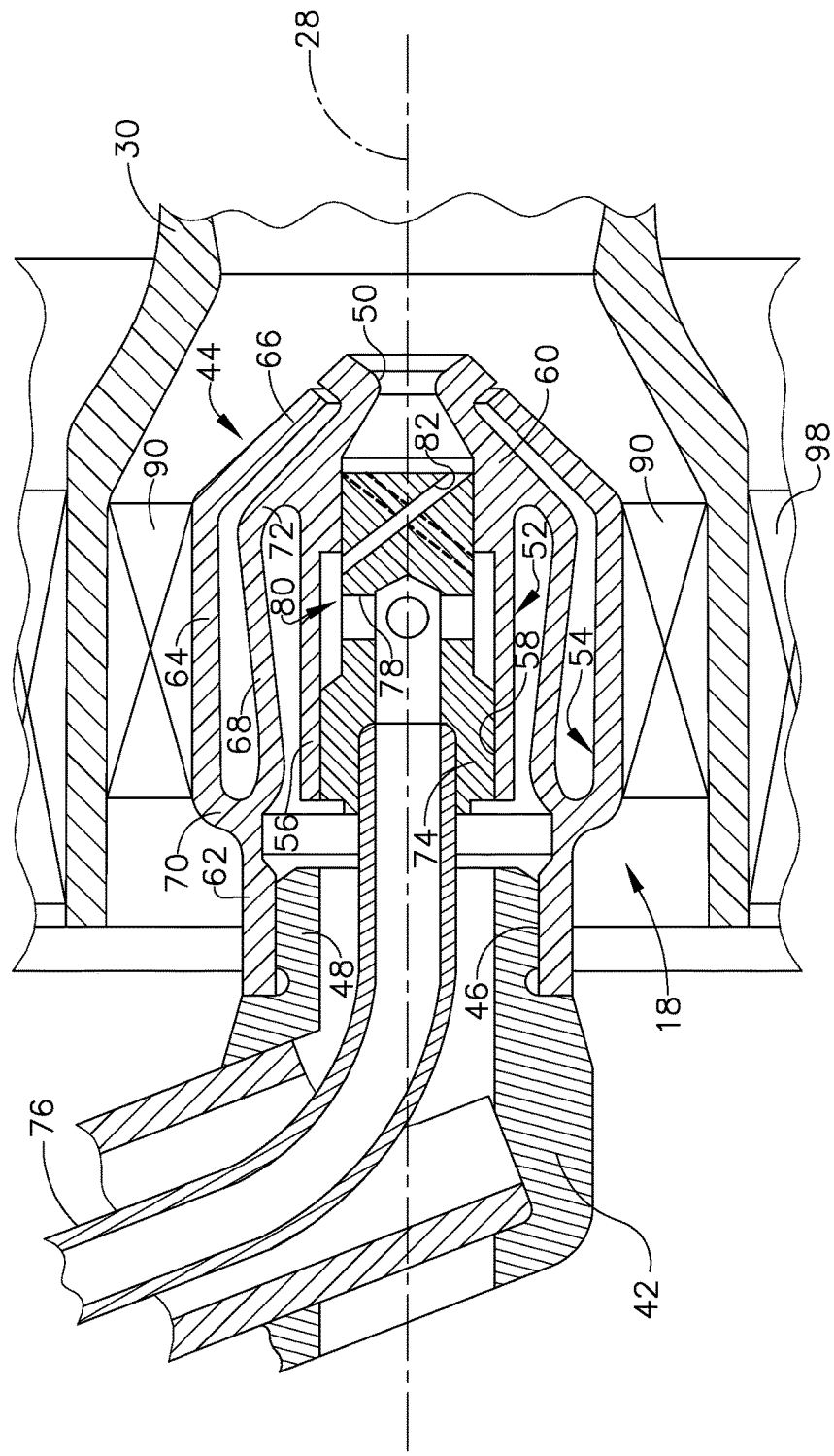
FIG. 2 is an enlarged view of a portion of the fuel nozzle shown in FIG. 1, showing a pilot thereof.

The illustrated pilot 18, seen in more detail in FIG. 2, includes a generally cylindrical, axially-elongated, pilot centerbody 44. An upstream end of the pilot centerbody 44 defines a cylindrical socket 46 which is mounted to a cylindrical tip 48 of the fairing 42. It may be secured to the tip 48 by any method providing a secure fit, for example an interference fit, or by brazing or welding. The downstream end of the pilot centerbody 44 includes a converging-diverging discharge orifice 50 with a conical exit.

The structure of the pilot centerbody 44 includes an annular inner wall 52 surrounded by an annular outer wall 54. The inner wall 52 is generally cylindrical and aligned with the centerline axis 28. has a forward section 56 that defines a central bore 58, and an aft section 60 oriented at an acute angle to the forward section 56. The aft section 60 defines the discharge orifice 50.

The outer wall 54 includes as forward section 62 that defines the socket 46, a central, generally cylindrical center section 64, and an aft section 66 oriented at an acute angle to the center section 64 and extending generally parallel to the aft section 60 of the inner wall 52. The outer wall constitutes a "static supporting structure".

One or more support arms interconnect the inner wall 52 and the outer wall 54. In the illustrated example, a single, fully-annular support arm 68 is provided. Optionally it could be configured as an annular array of individual support arms (not shown). The support arm 68 extends from the junction of the forward and center sections 62 and 64 of the outer wall 54 to the aft section 60 of the inner wall 52. The forward and aft ends of the support arm 68 join the outer wall 54 and the aft section 60 of the inner wall 52 at smoothly-curved, arcuate forward and aft junctions 70 and 72, respectively. In the illustrated example the curvature of the two junctions are opposite each other. The support arm 68 may be disposed at an acute angle to the centerline axis 28 as illustrated. This permits the transition radii of the forward and aft junctions 70 and 72 to be maximized where required in the available space helping to provide structure with more gradual changes in component stiffness between the outer wall 54 and the support arm 68, and the support arm 68 and the inner wall 52. More evenly distributed gradients in the mechanical and thermal loading that flow within the structure result in lower developed stresses.

The support arm 68 is a type of flexible support structure, as that term is used herein. The support arm 68 has a relatively small cross-sectional thickness and a relatively long axial length (high L/D ratio) which allows it to perform as a spring element. The inner wall 52 is thus cantilevered from the outer wall 54 by way of the support arm 68, which is stiff, as required in the high-vibration conditions encountered during engine operation, but also somewhat compliant. During engine operation, the arrangement of the support arm 68 attenuates both heat and load transfer from the outer wall 54 (which is exposed to compressor discharge airflow and is therefore relatively hot) to the inner wall 52 (which is isolated from airflow and exposed to liquid fuel flow and is therefore relatively cold).

The support arm 68 is functionally integral with the outer wall 54 and the inner wall 52. As used herein, the term "functionally integral" implies that the support arm 68 is configured to mechanically and thermodynamically interact with the outer wall 54 and the inner wall as if all three components were part of a single unitary, one-piece, or monolithic configuration. For example, mechanical joints, or discontinuities in composition or physical properties are not present at the forward and aft junctions 70 and 72.

In the illustrated example, the inner wall 52, the outer wall 54, and the support arm 68 are all part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLS), Electron Beam Melting (EBM), Laser Engineered Net Shaping (LENS), and Direct Metal Deposition (DMD). Use of an additive manufacturing process is particularly helpful in allowing the support arm 68, inner wall 52, and outer wall 54 to be formed according to a designer's intent without limitations of a component assembled from individual parts, and with low labor and tooling costs.

A metering plug 74 is disposed within the central bore 58 of the pilot centerbody 44. The metering plug 74 communicates with a crossover conduit 76 passing from the main injection ring 24 and through the strut 28 to the metering plug 74. The metering plug 74 includes transfer holes 78 that flow fuel to a feed annulus 80 defined between the metering plug 74 and the central bore 58, and also includes an array of angled spray holes 82 arranged to receive fuel from the feed annulus 80 and meter the flow while adding significant tangential momentum. Swirl induced in the flow by this tangential component upstream of discharge orifice 50 facilitates even dispersion of the fuel as it is injected into the combustor through the discharge orifice 50. {The metering plug 74 with its transfer holes 78 and spray holes 82 constitutes a fuel discharge element having a connection to a fuel supply and a discharge orifice.}

Referring back to FIG. 1, the annular splitter 30 surrounds the pilot 18. It includes, in axial sequence: a generally cylindrical upstream section 84, a throat 86 of minimum diameter, and a downstream diverging section 88.

An inner air swirler includes a radial array of inner swirl vanes 90 which extend between the outer wall 54 of the pilot centerbody 44 and the upstream section 84 of the splitter 30. The inner swirl vanes 90 are shaped and oriented to induce a swirl into air flow passing through the inner air swirler.

The annular venturi 32 surrounds the splitter 30. It includes, in axial sequence: a generally cylindrical upstream section 92, a throat 94 of minimum diameter, and a downstream diverging section 96. A radial array of outer swirl vanes 98 defining an outer air swirler extend between the splitter 30 and the venturi 32. The outer swirl vanes 98, splitter 30, and inner swirl vanes 90 physically support the pilot 18 in cooperation with the fairing 42 The outer swirl vanes 98 are shaped and oriented to induce a swirl into air flow passing through the outer air swirler. The bore of the venturi 32 defines a flowpath for a pilot air flow, generally designated "P", through the fuel nozzle 10. A heat shield 100 in the form of an annular, radially-extending plate may be disposed at an aft end of the diverging section 96. A thermal barrier coating (TBC) (not shown) of a known type may be applied on the surface of the heat shield 100 and/or the diverging section 96.

The annular inner body 34 surrounds the venturi 32 and serves as a radiant heat shield as well as other functions described below.

The annular main ring support 36 surrounds the inner body 34. The main ring support 36 may be connected to the fairing 42 and serves as a mechanical connection between the main injection ring 24 and stationary mounting structure such as a fuel nozzle stem, a portion of which is shown as item 102. The main ring support 36 constitutes a "static supporting structure".

Figure 3:
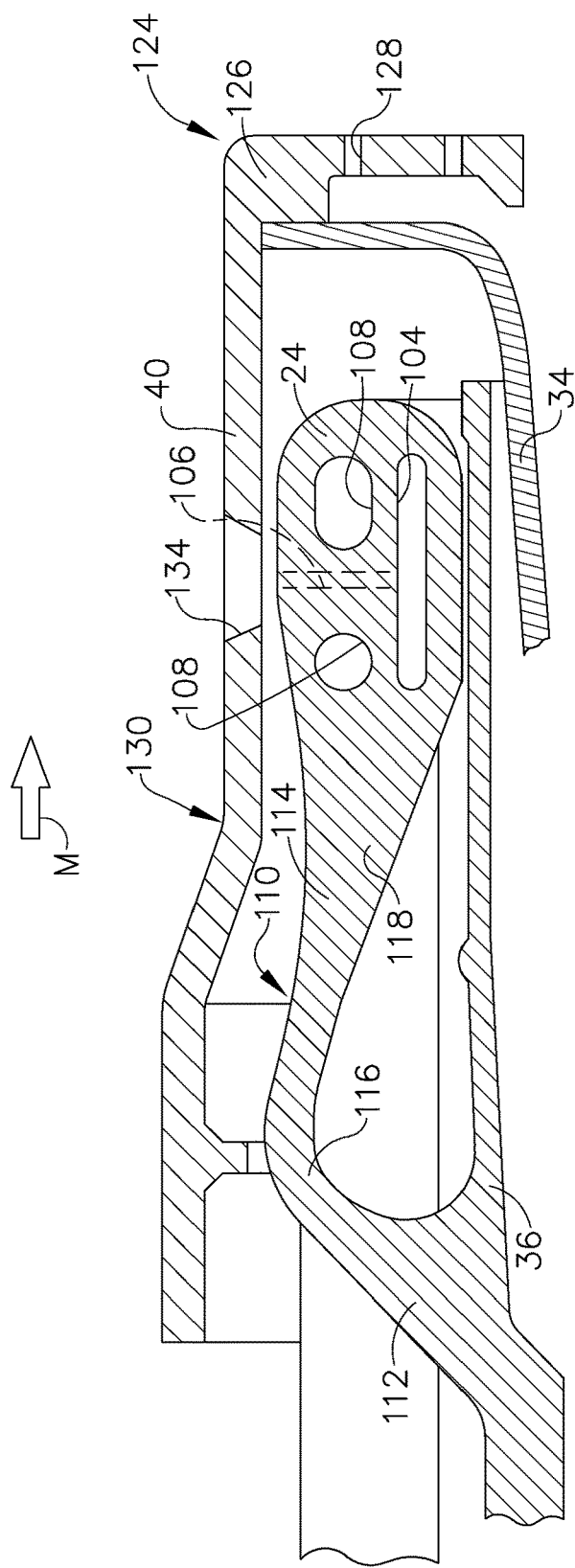
FIG. 3 is an enlarged view of a portion of the fuel nozzle shown in FIG. 1, showing a main injection ring thereof.

The main injection ring 24 which is annular in form surrounds the venturi 32. As seen in FIG. 3, the main injection ring 24 is hollow and includes a circumferential main fuel gallery 104 which is coupled to and supplied with fuel by the main fuel conduit 22. A radial array of main fuel orifices 106 formed in the main injection ring 24 communicate with the main fuel gallery 104. During engine operation, fuel is discharged through the main fuel orifices 106. Running through the main injection ring 24 closely adjacent to the main fuel gallery 104 are one or more pilot fuel galleries 108. During engine operation, fuel constantly circulates through the pilot fuel galleries 108 during engine operation to cool the main injection ring 24 and prevent coking of the main fuel gallery 104 and the main fuel orifices 106. The main injection ring 24 with its main fuel gallery 104 and main fuel orifices 106 constitutes a fuel discharge element having a connection to a fuel supply and a discharge orifice.

The main injection ring 24 is connected to the main ring support 36 by an annular array of main support arms 110. Optionally, the main support arms 110 could be configured as a single, fully-annular structure. Each of the main support arms 110 is generally L-shaped in cross-section, with a forward portion 112 that extends radially outward and aft from the main ring support 36, and an aft portion 114 that extends axially aft and radially inward from an outer end of the forward portion 112. The main support arms 110 may optionally be circumferentially angled or swept and, thus, may be referred to as being helical. The forward and aft ends of each main support arm 110 join the main ring support 36 and the main injection ring 24 at smoothly-curved forward and aft junctions 116 and 118, respectively. In the illustrated example the curvature of the two junctions are opposite each other.

Figure 4:
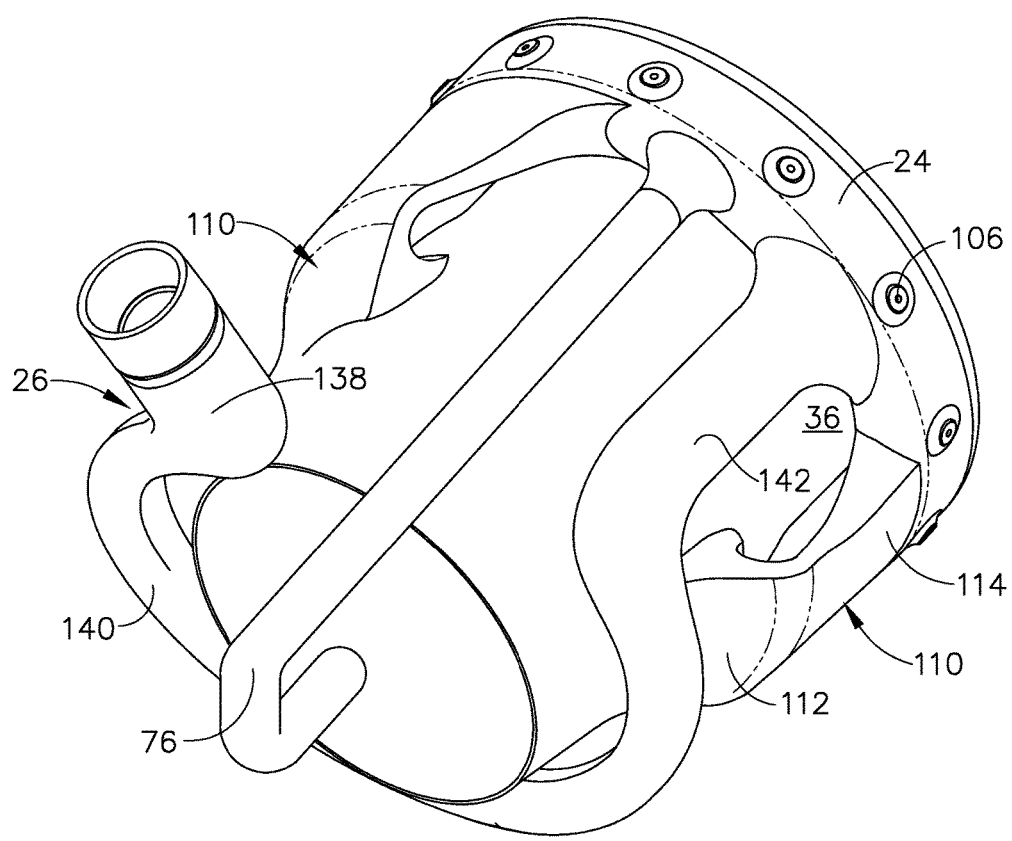
FIG. 4 is a schematic perspective view of a fuel conduit and main injection ring of the fuel nozzle shown in FIG. 1, with other structures of the fuel nozzle removed.
Figure 5:
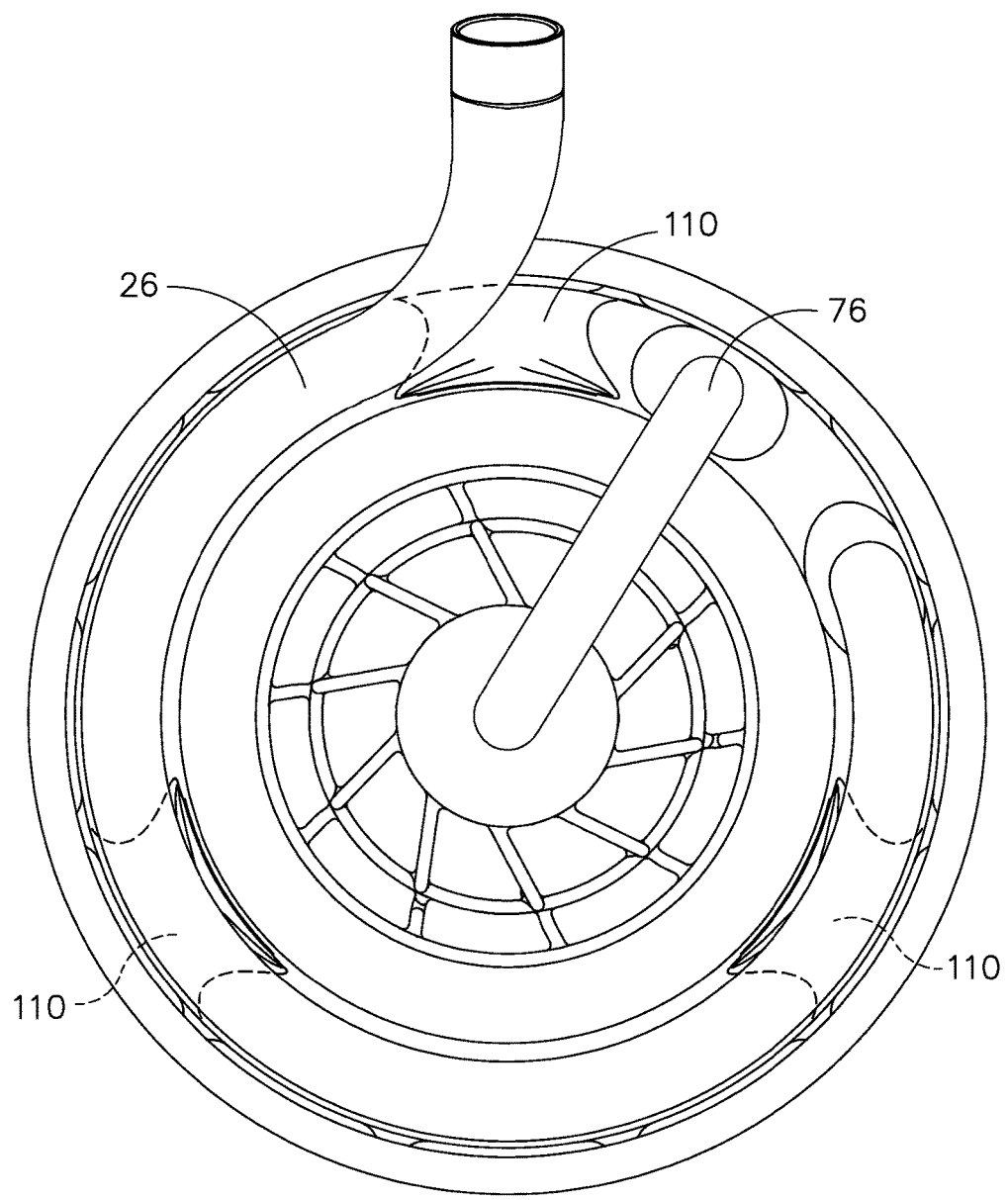
FIG. 5 is a front elevation view of the structure shown in FIG. 4.

As seen in FIGS. 4 and 5, the main support arms 110 are circumferentially spaced apart from each other. Three equally-spaced apart main support arms 110 are shown as an example, but a greater or lesser number could be employed. The arrangement of the main support arms 110 reduces heat transfer to the relatively cold fuel-bearing main injection ring 24 and minimizes thermally induced strain due to the temperature differential between the main injection ring 24 and the outer body 40. The main support arms 110 suspend the main injection ring 24 within the outer body 40 to keep the main injection ring 24 relatively cool.

The main support arms 110 are a type of flexible support structure, as that term is described above. Each main support arm 110 has a relatively small cross-sectional thickness and a relatively long axial length (high L/D ratio) which allows it to perform as a spring element. In the illustrated example, the main support arm 110 has a maximum thickness (measured in the radial direction) at the aft junction 118, tapering to a minimum thickness at the forward junction 116. The main injection ring 24 is thus cantilevered from the main ring support 36 by way of the main support arms 110. During engine operation, the arrangement of the main support arms 110 attenuates both heat and load transfer to the main injection ring 24.

In an illustrated example, the main injection ring 24, the main ring support 36, and the main support arms 110 are all part of a single unitary, one-piece, or monolithic component, and may be manufactured utilizing an additive manufacturing process as described above. Use of an additive manufacturing process is particularly helpful in allowing the main injection ring 24, the main ring support 36, and the main support arms 110 to be formed according to a designer's intent without limitations of a component assembled from individual parts, and with low labor and tooling costs.

The annular outer body 40 surrounds the main injection ring 24, venturi 32, and pilot 18, and defines the outer extent of the fuel nozzle 10. A forward end 122 of the outer body 40 is joined to the stem housing 102 when assembled (see FIG. 1). An aft end 124 of the outer body 40 may include an annular, radially-extending baffle 126 incorporating cooling holes 128 directed at the heat shield 100. Extending between the forward and aft ends 122, 124 is a generally cylindrical exterior surface 130 which in operation is exposed to a mixer airflow, generally designated "M." The outer body 40 defines a secondary flowpath 120, in cooperation with the venturi 32 and the inner body 34. Air passing through this secondary flowpath 120 is discharged through the cooling holes 128.

As best seen in FIG. 3 the exterior surface 130 of the outer body 40 includes an array of recesses or openings referred to as "spray wells" 134 formed therein. Each of the spray wells 134 is aligned with one of the main fuel orifices 106 so that fuel may pass from orifices 106 of the main ring through the main body outer wall 40 for injection into the combustor.

The fuel conduit 26 is shown in more detail in FIGS. 1 and 4. As noted above, the illustrated fuel conduit 26 is concentric tube-in-tube design with the inner tube serving as the main fuel conduit 22 and the outer tube serving as the pilot fuel conduit 16. A spirally-wrapped wire 136 of a known type maintains spacing of the annulus between the two tubes. The lead of the wrapped wire 136 is set to define a specific flow path within this annulus with effective area needed to generate a desired flow velocity and heat transfer with acceptable pressure drop. Other types of multi-circuit fuel conduits are known (for example, flat or oval cross-section conduits with side-by-side fuel circuits). These kinds of multi-circuit configurations may be substituted for the coaxial designed illustrated herein.

The fuel conduit 26 includes a first portion 138 which is generally radial, a second portion 140 which is arcuate and wraps around the main ring support 36, and a third portion 142 which is axial and connects to the main injection ring 24. During engine operation, thermal growth of the stem 102 and nozzle 10 tends to drive changes in static position of the fuel nozzle 10 relative to the stationary structures they are mounted to as a function of temperature and distance from the mount. The curved shape of the second portion 140 provides flexibility to accommodate this relative motion without incurring stresses in the components to which it is attached.

Within the main injection ring 24, internal passages (not shown) are arranged such that the pilot fuel conduit 16 communicates with the pilot fuel gallery 108 and the main fuel conduit 22 communicates with the main fuel gallery 104. The pilot fuel galleries 108 in turn connect to the crossover conduit 76 that feeds the pilot 18.

The exemplary fuel nozzle 10 illustrated and described herein may be an assembly of various parts or elements. Alternatively, all or a portion of the fuel nozzle 10 or lesser subassemblies or components may be of unitary, one-piece, or monolithic configuration, and may be manufactured utilizing an additive manufacturing process as described above.

The embodiments of the present invention described above provide a means to mechanically support structures within a fuel nozzle while mechanically and thermally isolating those structures from other parts of the fuel nozzle. This will reduce thermal and mechanical stresses in the fuel nozzle and also helps prevent coking in small fuel-bearing passages.

The foregoing has described a gas turbine engine fuel nozzle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A fuel nozzle apparatus, comprising:
an annular injection ring disposed coaxially along a centerline axis and having a circumferential fuel gallery therein, and including a radial array of fuel orifices communicating with the fuel gallery;
an annular ring support disposed coaxially along the centerline axis and radially inward of the annular injection ring;
and a support arm interconnecting the annular ring support and the annular injection ring,
wherein a forward portion of the support arm joins the annular ring support at a forward junction and an aft portion of the support arm extends axially aft of the forward portion to join the annular injection ring at an aft junction,
wherein the forward portion extends in a radially outward direction and the aft portion extends in a radially inward direction,
wherein the annular injection ring is cantilevered from the annular ring support by way of the support arm.

2. The apparatus of claim 1 wherein the support arm is one of an array of circumferentially-spaced-apart support arms.

3. The apparatus of claim 1 wherein the support arm is a single, fully-annular structure.

4. The apparatus of claim 1 wherein each of the forward and aft junctions has a smoothly-curved, arcuate shape.

5. The apparatus of claim 4 wherein the support arm has a maximum thickness at the aft junction, tapering to a minimum thickness at a location where the aft portion joins the forward portion.

6. The apparatus of claim 1 further comprising a main fuel conduit communicating with the annular injection ring, the fuel conduit including:
a first portion which extends in a generally radial direction;
a second portion which is arcuate and wraps around the annular ring support; and
a third portion which is axial and connects to the annular injection ring.

7. The apparatus of claim 1 further comprising:
an annular outer body surrounding the annular injection ring, the annular outer body having a generally cylindrical exterior surface extending between forward and aft ends, and having a plurality of spray wells passing through the exterior surface; and
an annular inner body disposed inside the annular outer body, cooperating with the outer body to define a flowpath;
each fuel orifice of the radial array of fuel orifices being aligned with one spray well of the plurality of spray wells.

8. The apparatus of claim 7 further including:
an annular inner body disposed inside the annular outer body;

an annular venturi including a throat of minimum diameter disposed inside the annular inner body
an annular splitter disposed inside the annular venturi;
an array of outer swirl vanes extending between the annular venturi and the annular splitter;
a pilot fuel injector disposed within the annular splitter; and
an array of inner swirl vanes extending between the annular splitter and the pilot fuel injector.

9. The apparatus of claim 8 further including:
a fuel system operable to supply a flow of liquid fuel at varying flowrates;
a pilot fuel conduit coupled between the fuel system and the pilot fuel injector; and
a main fuel conduit coupled between the fuel system and the annular injection ring.

\* \* \* \* \*